Aug. 5, 1958

P. E. KOPP 2,846,098

TILE HANDLING CONVEYOR

Filed June 21, 1956

INVENTOR.
PHILIP E. KOPP
BY
W.B. Harpman
ATTORNEY

INVENTOR.
PHILIP E. KOPP
ATTORNEY

Aug. 5, 1958

P. E. KOPP 2,846,098

TILE HANDLING CONVEYOR

Filed June 21, 1956

INVENTOR.
PHILIP E. KOPP
BY
*W. B. Harpman*
ATTORNEY

United States Patent Office 2,846,098
Patented Aug. 5, 1958

2,846,098

TILE HANDLING CONVEYOR

Philip E. Kopp, Minerva, Ohio

Application June 21, 1956, Serial No. 592,890

10 Claims. (Cl. 214—314)

This invention relates to a conveyor and more particularly to a conveyor adapted to receive newly formed wet clay tile from a forming machine, convey and position the tile in a vehicle which may then be moved into a kiln for firing the tile.

The principal object of the invention is the provision of a conveyor mechanism for receiving newly formed clay products, moving, turning and depositing them at a desired remote location.

A further object of the invention is the provision of a clay product handling conveyor which is automatically actuated and which receives clay products from one direction, moves them in another direction, turns them and deposits them in a desired location.

A still further object of the invention is the provision of a conveyor means for clay products which will operate automatically without manual supervision to receive, convey and deposit clay products as produced by a forming machine or machines.

A still further object of the invention is the provision of a conveyor means which incorporates a combination of conveyor elements arranged at right angles to one another whereby clay products may be moved by the conveyor to a given point and removed therefrom in a different direction.

A still further object of the invention is the provision of a conveyor mechanism that will move clay products, for example, on a substantially horizontal plane and then on a vertical plane and turn said clay products from one position to another during such movement.

The tile handling conveyor disclosed herein comprises an improvement in the art of tile manufacture in that a conveyor mechanism is disclosed which will automatically and continuously receive clay products, for example, hollow tile in wet condition as formed by extruding and cutting apparatus known in the art, move the clay products along a conveyor line at a direction different from that from which they were received, turn them as from their sides to their ends and lower them into a vehicle which will then transport them to a kiln for firing, all without the need of manual supervision or control.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 1:
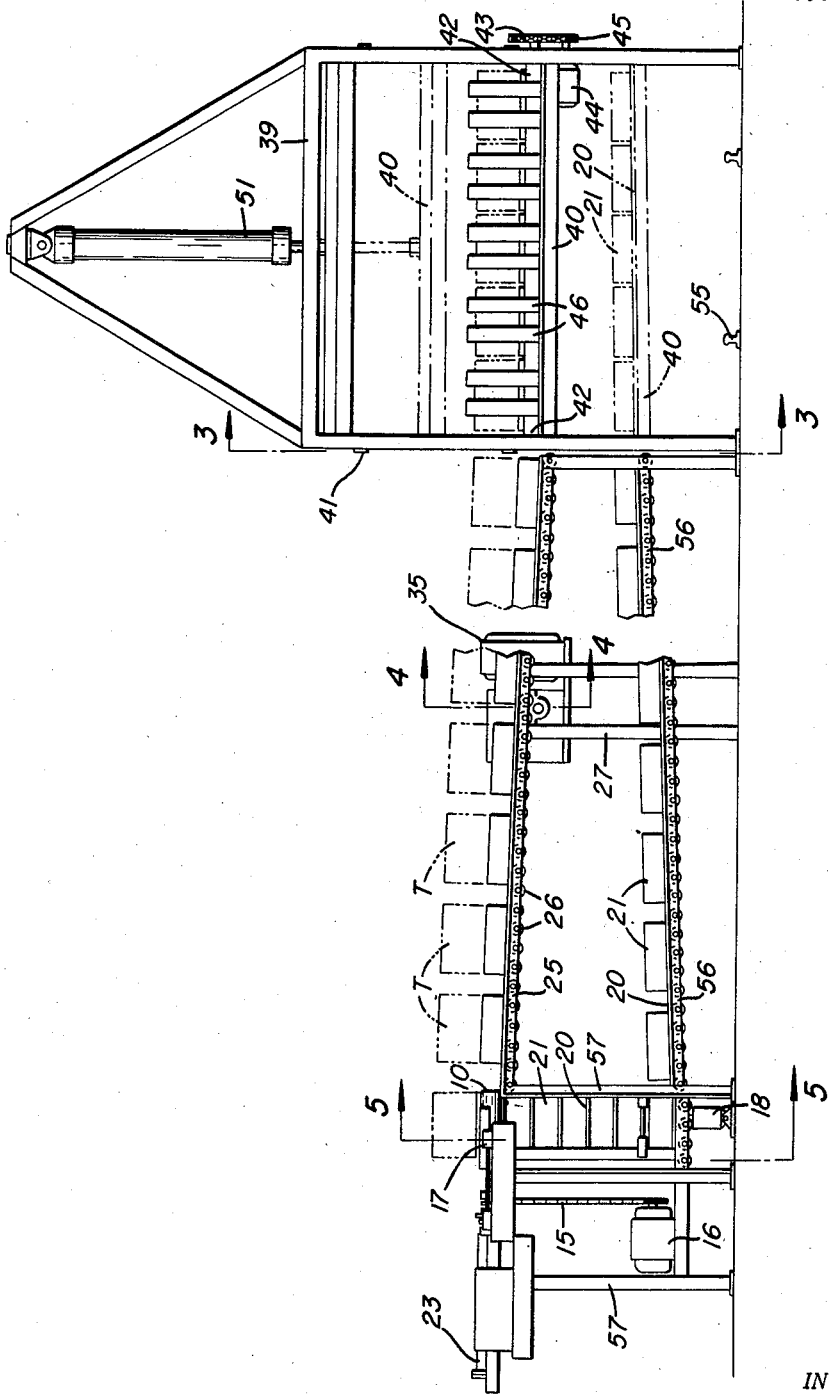
Figure 1 is a side elevation of the tile handling conveyor.
Figure 2:
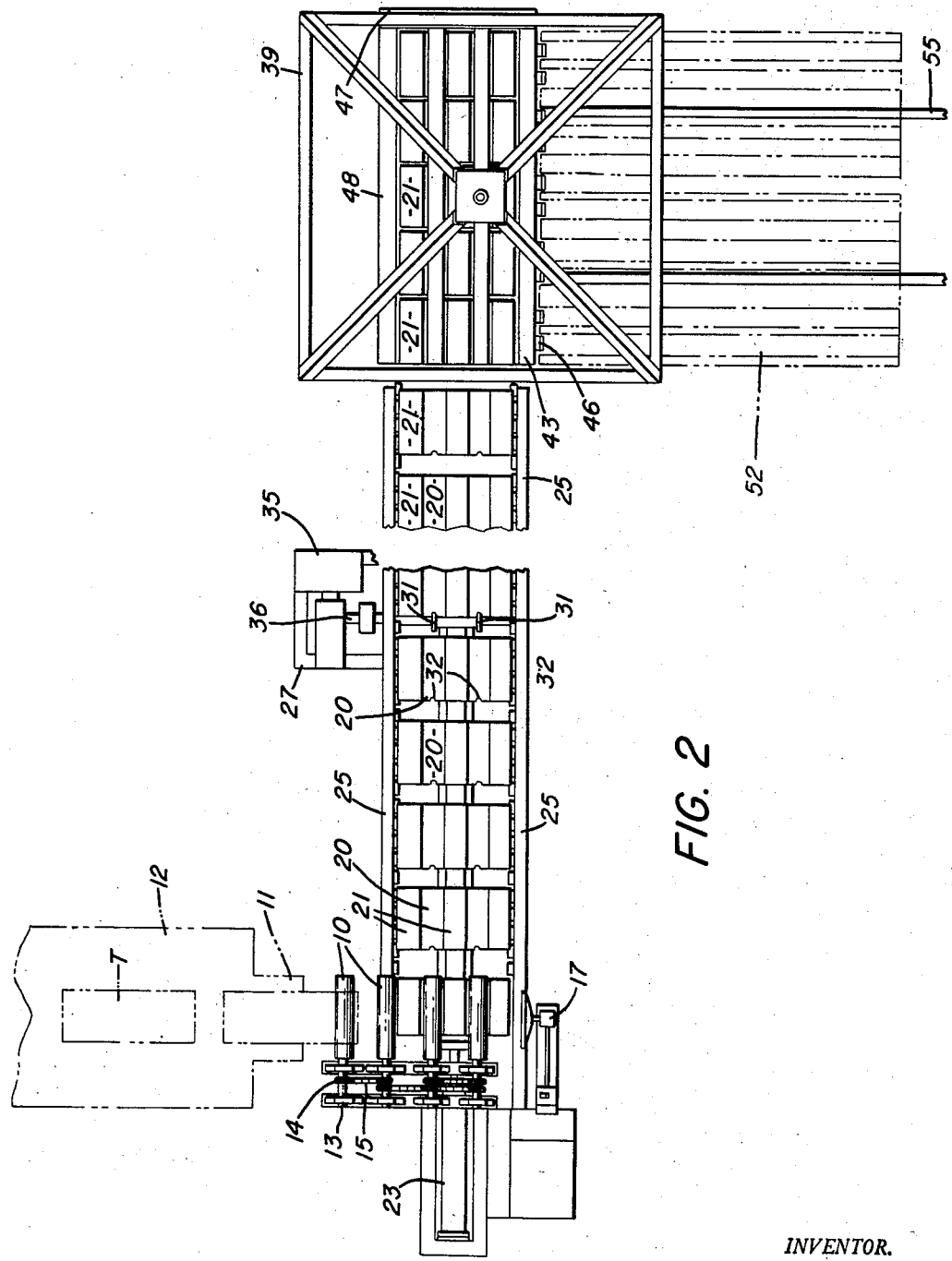
Figure 2 is a top plan view thereof.

By referring to the drawings and Figures 1 and 2 in particular it will be seen that wet newly formed clay tile, for example, are received by a plurality of horizontally disposed roller conveyors 10—10 from a delivery platform 11 of a tile forming and cutting machine 12. The delivery platform 11 and tile forming and cutting machine 12 are represented by broken lines in Figure 2 of the drawings.

Each of the roller conveyors 10—10 has a drive shaft 13 thereon which are provided with sprockets 14, and chains 15 interconnect the same with a driving motor 16 best seen in Figure 1 of the drawings.

A limit switch 17 positioned adjacent the opposite end of the roller conveyors 10—10 controls the motor 16 so that when a clay tile T moves into position thereon, it engages the limit switch 17, stops the motor 16 and the roller conveyors 10—10 and simultaneously actuates a pneumatic piston and cylinder 18 which is disposed vertically beneath the plurality of roller conveyors 10—10 and which is adapted to lift a pallet 20 having a plurality of spaced raised blocks 21—21 thereon vertically so that the blocks 21—21 move up between the roller conveyors 10—10 and lift the tile T therefrom. Vertical motion of the pallet 20 as occasioned by the piston and cylinder 18 actuates a secondary limit switch 22 which in turn controls a secondary horizontally disposed piston and cylinder 23 by way of a solenoid air valve 24 which is then energized and the piston of which moves outwardly to push the pallet 20 and the clay tile T thereon longitudinally of the conveyor roller 10—10 and onto a conveyor track 25 which incorporates a plurality of conveyor rollers 26 in oppositely disposed relation longitudinally of the conveyor track 25 so that the successive pallets 20, each carrying a tile, may move substantially horizontally therealong and away from the first location of the conveyor rollers 10—10 heretofore referred to.

Figure 4:
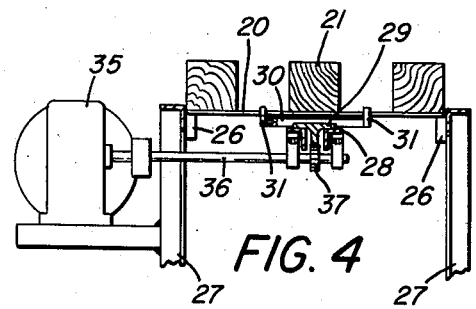
Figure 4 is a detailed elevation taken on line 4—4 of Figure 1.

The conveyor track 25 is supported by vertical legs 27—27 and this structure also supports a longitudinally disposed guide 28, as also seen in enlarged detail in Figure 4 of the drawings, which has a bracket 29 slidably disposed thereon and thereby movable longitudinally of the conveyor track 25 and midway between the sides thereof.

The bracket 29 has a crossarm 30 secured to one end thereof with movable pawls 31—31 which are adapted to be depressed by the pallets 20 as the same move thereover and be spring urged to upright position so that they engage the trailing edges of the pallets 20 and register with grooves 32—32 therein.

Figure 3:
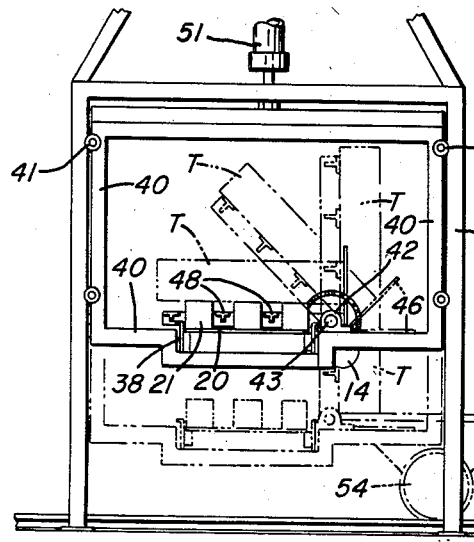
Figure 3 is a detailed end elevation taken on line 3—3 of Figure 1.
Figure 6:
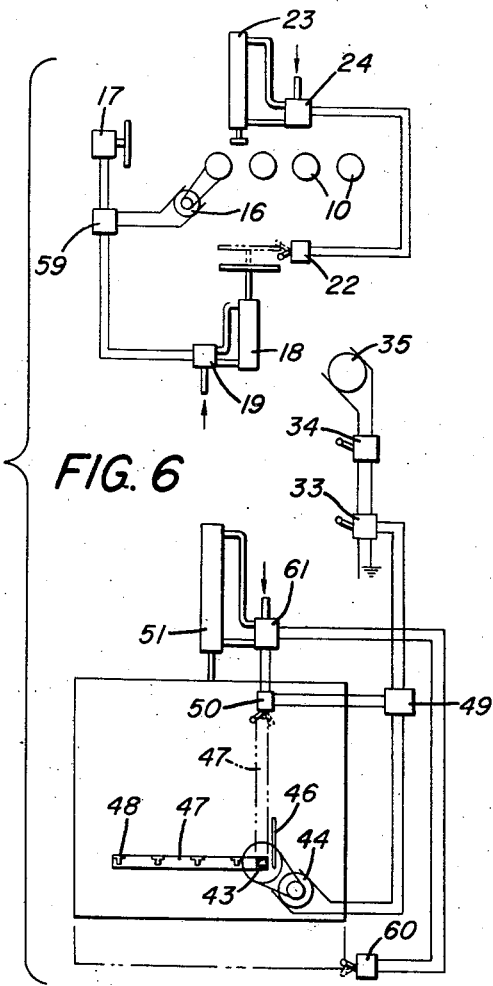
Figure 6 is a schematic diagram of mechanical and pneumatic means for actuating the various portions of the tile handling conveyor together with limit switches controlling the same.

Thus, when a plurality of pallets 20, each with its plurality of blocks 21—21 and each carrying a tile T thereon, are moved on to the opposite end of the conveyor track 25 with respect to the pneumatic piston and cylinder 23, limit switches 33 and 34, as may be seen by referring to Figure 6 of the drawings, are engaged whereby a motor 35 is energized, a shaft 36 revolved thereby and a pinion 37 thereon engaged with a rack formed on the bracket 29 revolved so that the bracket 29 slides along the guides 28 with the pawls 31 on the crossarm 30 pushing the several pallets 20—20 along the conveyor track 25 and onto a vertically movable section of roller conveyor track 38 which in turn is positioned in a vertically extending frame 39, as best seen in Figures 1, 2 and 3 of the drawings.

The vertically movable section of roller conveyor track 38 includes a frame 40 incorporating vertical sections which are provided with wheels 41 engaging vertical guides on the frame 39.

The vertically movable section of roller conveyor track 38 has spaced journals 42—42 thereon in which a shaft 43 is rotatably positioned. A motor 44 is mounted on the vertically movable section of conveyor roller track 38 and is connected by means of sprockets and chains 45 with the shaft 43 so that the same may be moved thereby.

One end of the shaft 43 (the opposite end thereof with respect to the end adjacent the conveyor roller track 25) supports a frame member 47 which in turn has a plurality of secondary frame members 48—48 positioned in spaced parallel relation with the shaft 43.

It will be observed by referring to Figure 3 of the drawings in particular that the spaced frame members 48—48 normally lie in position between the blocks 21 on the pallets 20 and do not affect the movement of the pallets 20 onto this portion of the device.

When a sufficient number of pallets have been moved onto the vertically movable section of conveyor roller track 38, the limit switches 34 and 35 actuate a solenoid switch 49 which in turn energizes the motor 44 and causes the shaft 43 to move and thereby carry the frame members 47 and 48 upwardly on an arc based on a shaft 43, as best seen in Figure 3 of the drawings, so that the secondary frame members 48 lift the tile T from the blocks 21 on the pallets 20 and thereby move the tiles T from horizontal position to vertical position, as shown in dotted lines in Figure 3 of the drawings. The tiles then rest on a plurality of spaced parallel arms 46 which are secured to the shaft 43. The parallel arms 46 are in vertical position when the secondary frame members 48 are in uppermost horizontal position, as shown in broken lines in Figure 3 of the drawings, and they move in an arc based on the shaft 43 to a horizontal position, as shown in broken lines in Figures 2 and 3 of the drawings, when the shaft 43 is revolved.

When this occurs, the frame 47 engages a limit switch 50 which stops the motor 44 and energizes a third pneumatic piston and cylinder assembly 51 which is positioned vertically in the frame 39 above the vertically movable section of conveyor track 38 in its frame 40 and the piston of which is attached to the frame 40 so that the entire frame may be lowered thereby from the position shown in solid lines in Figures 1 and 3 of the drawings to the position shown in broken lines in Figure 3 of the drawings, whereby the vertically standing tiles T are lowered onto a longitudinally slotted deck 52 of a vehicle 53 which includes wheels 54 running on rails 55. The tiles T are then conveyed by the vehicle 53 to the kiln where they are fired.

It will occur to those skilled in the art that by forming the vehicle 53 with a desirable surface conformation, such as longitudinal slots in the deck 52 thereof, as aforesaid, the vehicle 53 may run completely underneath the frame 40 so that progressive rows of tiles may be positioned thereon and conveyed thereby to the kiln for firing.

When the tiles have been removed from the pallets 20, and more particularly the blocks 21 thereof, and the frame 40, which carries the vertically movable section of conveyor roller track 38, lowered to the position shown in broken lines in Figures 1 and 3 of the drawings, the pallets 20 will then roll off the vertical movable section of roller conveyor track 38 onto a lower level conveyor track 56 by means of which they return to a point immediately beneath the conveyor rollers 10—10 hereinbefore referred to.

Figure 5:
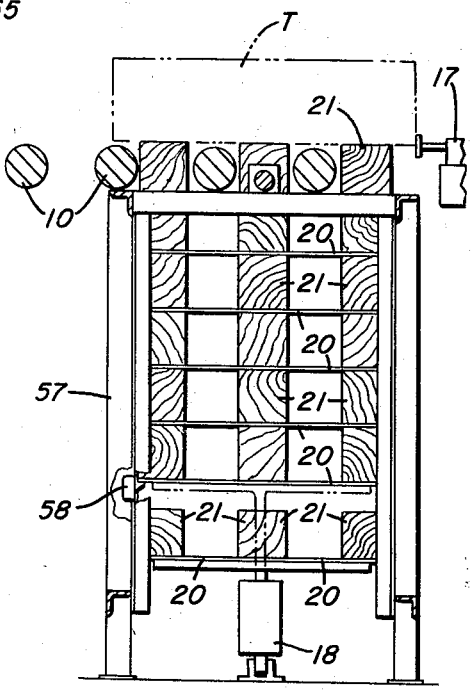
Figure 5 is a detailed elevation taken on line 5—5 of Figure 1.

The conveyor rollers 10—10 are supported on a vertical frame 57 which comprises in effect an extension of the frame 27 which supports the conveyor track 25 as well as a return conveyor track 56. Vertical guides in the frame 57 provide for the vertical alignment for the plurality of pallets 20 with their raised blocks 21 so that as the same are elevated one at a time by the pneumatic piston and cylinder assembly 18, they will rise vertically and be retained in position immediately above their delivery point by a plurality of ratchet members 58 which are secured to the frame 57 as best seen in Figure 5 of the drawings.

It will occur to those skilled in the art that by continually alternating in up and down motion the lifting portion of the air piston and cylinder 18 will cause the plurality of pallets 20 and blocks 21 to move vertically and when they reach the uppermost position they will move up between the rollers 10—10, as aforesaid, and thereby pick up the tile T which has moved thereon in the interim.

It will occur to those skilled in the art that the operation of the vertically pneumatic piston and cylinder 18 as well as the motor 16 which drives the roller conveyors 10 may be controlled by a cycling cam such as indicated symbolically in Figure 6 of the drawings by the numeral 59.

It will also occur to those skilled in the art that the vertical travel of the elevator-like vertically movable section of the conveyor track 38 will be used to actuate a limit switch 60 which in turn controls the third pneumatic piston and cylinder assembly 51 by way of a solenoid air valve 61.

It will thus be seen that the tile handling conveyor disclosed herein meets the several objects of the invention and enables clay products such as tiles to be received from a point of formation, such as the cutting and forming machine 12 symbolically illustrated in Figure 2 of the drawings, their direction of travel changed and the tiles moved along the conveyor roller track 25 to a point adjacent a kiln and the means of moving the tiles thereinto whereupon the mechanism turns the tiles from their on-side position to on-end position and lowers them onto the means by which they may be conveyed into the kiln.

It will also be seen that the entire operation may be automatically controlled without manual intervention and that increased production and uniformity of tile loading on the kiln vehicles results.

Having thus described my invention, what I claim is:

1. A tile handling device comprising a pair of substantially horizontally disposed vertically spaced conveyors each of which comprises spaced parallel members having a plurality of wheels rotatably mounted along its innermost sides and a plurality of pallets positioned on said wheels and movable along said conveyors, each of said pallets having a plurality of transversely spaced blocks positioned thereon, vertical guide means at one end of said conveyors and vertically movable means in said guide means for elevating said pallets, means for moving a tile into position above said vertical guide means, said means comprising a plurality of horizontally disposed rollers positioned longitudinally of said conveyors and on a plane above the uppermost one of said pallets and beneath the uppermost surfaces of said blocks on said pallets, said rollers spaced with respect to one another so as to enable said blocks on said pallets to move upwardly therebetween and lift a tile thereon thereabove, means for moving said pallets onto the uppermost one of said conveyors, a device at the opposite end of said conveyors for lifting tiles from said pallets and lowering said pallets into alignment with the lower one of said conveyors for returning them to the other end of said conveyors, said device comprising a vertically movable frame having a secondary horizontally disposed conveyor thereon normally in end-to-end alignment with the uppermost one of said conveyors, a shaft disposed alongside said secondary conveyor, an arm at one end of said shaft and a plurality of secondary arms extending in spaced parallel relation to said shaft and normally disposed between said blocks on said pallets, a plurality of vertical members on said shaft and means for rotating said shaft whereby said secondary arms move in an arc based on said shaft lifting said tile from said pallets and turning said tile a quarter turn so as to support said tile on said plurality of vertical members, and means for lowering and raising said frame.

2. The tile handling device set forth in claim 1 and wherein the vertically movable means for elevating said pallets comprises a pneumatic piston and cylinder assembly and wherein said vertical guide means have pawls extending into the vertical path of said pallets for holding said pallets in elevated relation with respect to said piston and cylinder assembly.

3. The tile handling device set forth in claim 1 and wherein said plurality of horizontally disposed rollers are mounted on end supported shafts having sprockets thereon and wherein chain means interconnect said sprockets and a driving motor therefor.

4. The tile handling device set forth in claim 1 and wherein the means for moving the pallets onto the uppermost one of said conveyors comprises a secondary pneumatic piston and cylinder assembly horizontally disposed adjacent to and above the plane of said rollers and in oppositely disposed end alignment with said uppermost of said conveyors.

5. The tile handling device set forth in claim 1 and wherein secondary vertical guides are positioned about said vertically movable frame and said vertically movable frame is journaled therein, said secondary vertical guides support a third pneumatic piston and cylinder assembly above said vertically movable frame, the piston of said third piston and cylinder assembly being secured to said vertically movable frame.

6. The tile handling device as set forth in claim 1 wherein the secondary horizontally disposed conveyor on said vertically movable frame comprises a pair of spaced parallel members having a plurality of wheels rotatably mounted along their innermost sides.

7. The tile handling device as set forth in claim 1 wherein the lowermost one of said conveyors extends into the lower portion of said vertical guides so as to permit pallets returning therealong to move into the area of the vertical guides.

8. The tile handling device as set forth in claim 1 wherein a limit switch is positioned at one side of said vertical guide means and above the uppermost portion thereof for engagement with tile moved into position thereover by said plurality of rollers, and wherein said rollers are interconnected with a motor for rotating the same, a power source for said motor, said limit switch controlling said power source.

9. The tile handling device as set forth in claim 1 wherein said uppermost one of said conveyors has a longitudinally movable bracket therebeneath and pawls on said bracket extending upwardly for engagement with said pallets, a rack on said bracket, motor driven means for moving said rack and bracket longitudinally of said conveyor to move pallets there along onto said vertically movable frame, a power source for said motor and a limit switch on said frame for controlling said power source.

10. The tile handling device as set forth in claim 1 and wherein a limit switch is positioned on said vertically movable frame for engagement by pallets moved thereonto, and wherein said means for rotating said shaft comprises a motor on said vertically movable frame, a power source for said motor, said limit switch controlling said power source.

References Cited in the file of this patent
UNITED STATES PATENTS

| | | |
|---|---|---|
| 1,846,258 | Johnson | Feb. 23, 1932 |
| 1,876,211 | Dyhrberg | Sept. 6, 1932 |
| 2,655,271 | Cole et al. | Oct. 13, 1953 |
| 2,711,616 | Weller et al. | June 28, 1955 |
| 2,770,346 | Oswalt | Nov. 13, 1956 |